No. 750,986.

Patented February 2, 1904.

UNITED STATES PATENT OFFICE.

VALENTIN LAPP, OF LEIPZIG, GERMANY.

PROCESS OF COATING INTERNAL WALLS OF METAL FERMENTING AND STORING VESSELS.

SPECIFICATION forming part of Letters Patent No. 750,986, dated February 2, 1904.

Application filed August 19, 1903. Serial No. 170,031. (No specimens.)

*To all whom it may concern:*

Be it known that I, VALENTIN LAPP, a subject of the King of Saxony, residing at No. 2 Georgi-Ring, Leipzig, in the Kingdom of Saxony, in the German Empire, have invented certain new and useful Improvements in Methods of Treating the Walls of Storage Vessels, of which the following is a specification.

In the vats and other vessels hitherto employed for fermenting and storing beer the coating of the internal surfaces in such manner as to insure a comparatively lasting security against a direct contact of the walls with the contents of the vat was not particularly difficult, because the said vessels have heretofore been comparatively small. The said vessels could be rolled without difficulty, and they were only conveyed into the fermenting or storage chamber when in a perfectly-finished condition. When, however, it is a question of vessels of considerable size, which have to be made of metal and which cannot be rolled, or only with difficulty, and are possibly of so large a size that they require to be built up in the required position within the cellar or chamber, the methods heretofore employed for coating such vessels can no longer be used. If it is a question of providing such vessels with a coating of a so-called "neutral" material, much greater care requires to be taken than heretofore to insure that such coating affords a really lasting security for the perfect prevention of any contact between the metal and the beer, because very much larger quantities of beer are under treatment at one time, and consequently the pecuniary loss in the event of deterioration would be very much greater. Even if it were possible to use one of the processes hitherto employed for these large vessels this would still be of doubtful utility, because those processes do not afford any lasting security.

The process which forms the subject of the present invention, which has only been determined after a very large number of experiments and long trials of a great variety of substances, has proved to satisfy all the requirements in the most perfect manner. The said process, which is composed of a number of different phases, is carried out as follows: The large metal vessels that are built up *in situ* in the fermenting or storage vaults are first washed out with ordinary pure cold or warm water and then with a warm or cold carbonate-of-soda solution. The walls are then painted with a tannic-acid solution, or preferably the solution is rubbed into the walls. In place of pure tannic acid a gall-apple extract can be used, taking about three kilos gall-apples to about ten liters of water. After the vessel has received a coating of this solution it is allowed to stand for from ten to twelve hours. The metal surface is during this time acted upon by the tannic acid, which enters the pores of the iron, forming tannate of iron. At the end of the above time the residues of the coating are washed off with warm water and the vessel is rinsed with cold water. The painting or rubbing in of the walls with the above-mentioned tannic-acid solution is then repeated, this being again allowed to stand ten to twelve hours, after which the walls are again washed with warm water and then rinsed with cold water. A third painting or rubbing in of the warm tannic-acid or gall-apple solution is then effected and is allowed to stand ten or twelve hours, but it is then not washed off as before; but the vessel is filled with water, which may be previously warmed, and the gall-apples that were used for making the extract, or the remainder thereof, are added to the water, and the whole is subjected to heating in the vessel and finally raised to boiling-point, which may be effected, for example, by suspending a steam-coil in the vessel and connecting it to a steam-supply for a sufficient length of time. This boiling is maintained for several hours, after which the liquid is removed and the vessel is again filled with water that may be warm. To this water are added hops, and the water and hops are again subjected to boiling, whereby not only a repeated reaction of tannic acid upon the iron takes place, although in this case of a weak nature, but also the vessel receives a better odor. By this last-named boiling the last remnants of the gall-apple extract are removed from the walls of the vessel, which is then completely emptied and is allowed to stand until its walls are dry, but still warm. The walls might even be allowed to get quite cold, as the heating necessary for the next phase can be effected without difficulty, for example, by means of the before-mentioned steam-coil. To the warm walls of the vessel a warm shellac solution is then applied, for which purpose is preferably used the so-called "internlac" of commerce. The coating of shellac is allowed to stand several days until it is thoroughly dry and hard, after which this coating is painted over with a saturated or supersaturated solution of raw gypsum in warm water. It has been found particularly advantageous to add to the water or to the gypsum solution about two per cent. of thick beer or one per cent. of beer-wort, because the gypsum solution is rendered slightly sticky thereby, and thus enables the gypsum to adhere more firmly to the shellac. When the raw-gypsum solution has dried upon the shellac coating, so as to adhere firmly thereto, the vessel is filled with a mixture of cold water and the same raw-gypsum solution, of which so much is taken that the water has a milky appearance. This dilute raw-gypsum solution is then heated in the vessel and boiled for from five to six hours. A peculiar reciprocal reaction is thus produced between the previously-applied coating of raw-gypsum solution and the shellac coating, whereby the two coatings combine to form a uniform coating, and a further reaction then takes place between this and the tannate of iron. While this takes place during the five to six hours boiling, the newly-forming combined coating takes up a further quantity of raw gypsum from the boiling solution. At the end of the boiling period the walls of the vessel will be found to be covered with an exceedingly uniform and dense and firmly-adhering coating that solidifies to a hard and resisting consistency, the water being allowed to cool gradually. The cold liquor having been then discharged there is only required a final rinsing for enabling the vessel to be used for fermenting or storing purposes. Any contact between the metallic walls and the beer is permanently prevented thereby.

Having thus described the nature of this invention and the best means I know of carrying the same into practical effect, I claim—

1. Process for coating the internal walls of metal fermenting and storing vessels wherein the said walls, after having been treated one or preferably several times with a tannic acid, are coated with a shellac solution and after the drying thereof, are subjected to the action of a boiling solution of raw gypsum, substantially as described.

2. Process for coating the internal walls of metal fermenting and storing vessels wherein the said walls are coated with tannic acid by applying thereto a solution of gall-apples and then allowing this to react for from ten to twelve hours, the metal walls being then coated with a shellac solution and after the drying thereof being subjected to the action of a boiling solution of raw gypsum, substantially as described.

3. Process for coating the internal walls of metal fermenting and storing vessels wherein the said walls are coated with tannic acid by applying thereto a solution of gall-apples and then allowing this to react for from ten to twelve hours, repeating this coating two or more times, the residues of each coating being washed off before applying the second, the metal walls being then coated with a shellac solution and after the drying thereof being subjected to the action of a boiling solution of raw gypsum, substantially as described.

4. Process for coating the internal walls of metal fermenting and storing vessels wherein the said walls are coated with tannic acid by applying thereto a solution of gall-apples and then allowing this to react for from ten to twelve hours, repeating this coating two or more times, and then subjecting the vessel to the action of boiling water to which the gall-apple residues are added, the metal walls being then coated with a shellac solution and after the drying thereof being subjected to the action of a boiling solution of raw gypsum, substantially as described.

5. Process for coating the internal walls of metal fermenting and storing vessels wherein the said walls are coated with tannic acid by applying thereto a solution of gall-apples and then allowing this to react for from ten to twelve hours, subjecting the vessel to the action of boiling water to which the gall-apple residues are added, and then to a boiling decoction of hops, the metal walls being then coated with a shellac solution and after the drying thereof being subjected to the action of a boiling solution of raw gypsum, substantially as described.

6. Process for coating the internal walls of metal fermenting and storing vessels wherein the said walls are coated with tannic acid by applying thereto a solution of gall-apples and then allowing this to react for from ten to twelve hours, the metal walls being then coated with a shellac solution and after the drying thereof being coated with a concentrated solution of raw gypsum the vessel being filled, after such coating is dry, with a boiling solution of raw gypsum, substantially as described.

7. Process for coating the internal walls of metal fermenting and storing vessels wherein the said walls are coated with tannic acid by applying thereto a solution of gall-apples and then allowing this to react for from ten to twelve hours, the metal walls being then coated with a shellac solution and after the drying thereof being coated with a concentrated solution of raw gypsum, the vessel being filled after such coating is dry, with a boiling solution of raw gypsum, a percentage of thick beer or beer-worts being added to such solution, substantially as described.

In witness whereof I have hereunto set my hand in presence of two witnesses.

VALENTIN LAPP.

Witnesses:
 OTTO GÜNTHER,
 F. B. ANHORN.